April 3, 1928.
H. H. HOLDAWAY
1,664,883
METHOD OF WELDING BEARING PINS TO LEGS OF DRILL BITS
Filed June 22, 1926
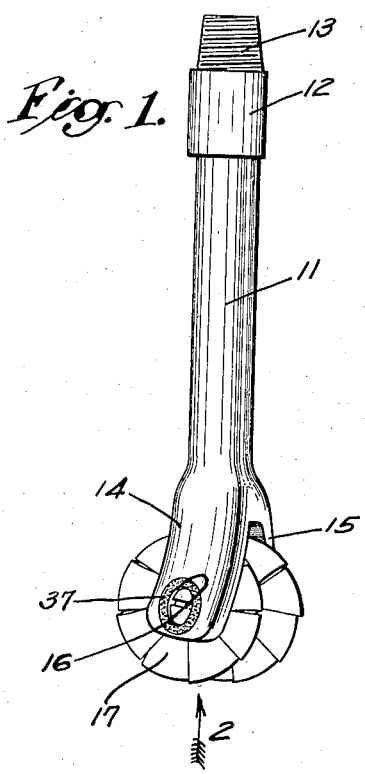
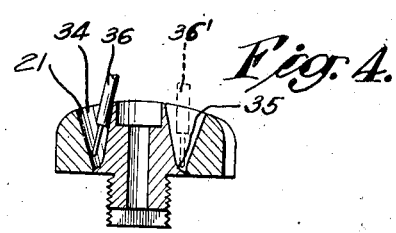
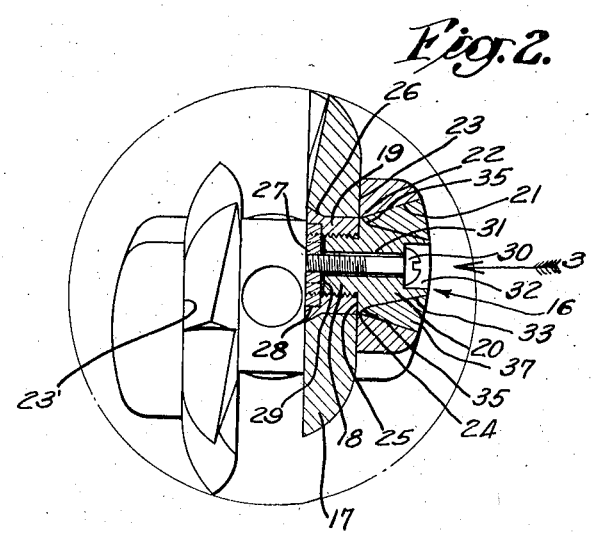
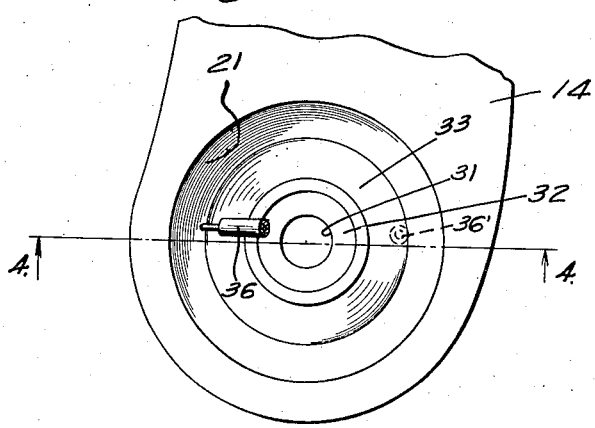
INVENTOR
HALL H. HOLDAWAY
By
ATTORNEY Patented Apr. 3, 1928.

1,664,883

UNITED STATES PATENT OFFICE.

HALL H. HOLDAWAY, OF LONG BEACH, CALIFORNIA.

METHOD OF WELDING BEARING PINS TO LEGS OF DRILL BITS.

Application filed June 22, 1926. Serial No. 117,670.

In Patent No. 1,569,280, granted January 12, 1920, is disclosed an improved type of disc bit comprising a shank which downwardly terminates in legs, the relatively inaccessible inner faces of these legs being provided with bearing pins or trunnions for cutting discs,—suitable bushings being secured upon said pins or trunnions in a manner which is immaterial to my present invention; and it is a primary object of this invention to improve upon the construction and method described or implied in the above mentioned patent,—the corresponding bearing pins herein described being separately forged, and said pins and legs being separately shaped to cooperate in the provision of an annular cavity favorable to welding operations by which said pins may be securely disposed at right angles to the inner faces of said legs.

It is an object of this invention to provide an improved method of securing a pin at a predetermined angle to a relatively inaccessible surface of a main member, such as a leg integral with a disc drill bit shank or body,—welding operations being executed from the side of a main member other than that from which said pin projects; and the herein described method has the notable advantages, among others, (1) that it simplifies the operations requisite to the forging of a main member such as a drill bit shank provided with separate legs, (2) that it permits accurate work, such as boring and thread-cutting operations, to be expeditiously done upon separate pins before they are attached to a shank; (3) that it greatly facilitates the replacement of pins in case of breakage, (4) that it assures a reliable weld, joining a pin to a main member, and (5) that it permits welding operations to be executed from a side opposite to that from which a pin is to project.

Other objects of my invention, including the use of a pin having a tapered body,—an intermediate portion of said pin having a maximum diameter adapting it to interfit within the narrowest portion of a non-uniform bore provided in a leg of a drill bit, and the body of said pin and said leg being respectively so cut away as to provide an annular space favorably shaped for efficient welding,—may be best appreciated from the following description of an illustrative embodiment of my invention, taken in connection with the appended claims, and the accompanying drawings, in which Fig. 1 is a perspective view of a drill bit whose legs are provided with pins inserted in accordance with my present invention.

Fig. 2 is a bottom plan view, upon an enlarged scale, taken as indicated by the arrow 2 of Fig. 1 with parts broken away.

Fig. 3 is a side elevational view on a somewhat enlarged scale, which may be regarded as taken from the direction indicated by the arrow 3 of Fig. 1, during welding operations of the general character hereinafter described.

Fig. 4 is a view taken substantially as indicated by the line 4—4 of Fig. 3.

Referring to the details of that specific embodiment of my invention chosen for purposes of illustration, Figs. 1 and 2 have reference more particularly to a finished product whereas Figs. 3 and 4 illustrate welding operations toward which claims of the present application are more particularly directed. The cylindrical shank 11 of a drill bit is shown as connected with a coupling or enlargement or "sub" 12, comprising a so-called pin 13, of a usual character,—legs 14 and 15 at the lower end of said shank being respectively provided with pins 16, which directly or indirectly support cutting discs 17; and, in the form of my invention selected for illustration, each of the pins 16 may comprise not only a threaded portion 18, adapted to carry a bearing bushing 19, but also a tapered body 20, shown as corresponding in length with the thickness of the leg through which it extends,—said leg being provided with an outwardly expanding bore 21, narrowest in a region 22, in proximity to inner face 23 of said leg and adapted to interfit, in this region, with an intermediate expansion 24, adjacent a flat face or shoulder 25 upon the body 20,—said shoulder being engageable by a corresponding annular surface of the bearing bushing 19, or its equivalent, and in the same plane with the mentioned inner face 23 of a leg.

Although details of construction of the bearing bushing 19, preferably formed of an exceptionally hard material, may be regarded as immaterial to my present invention, I mention that this bushing is shown as provided with a enlargement at 26, favorable to the retention of a cutting disc 17 thereon, and that the unscrewing of said bearing bushing from a pin 18 may be prevented by means such as a transversely extending key 27, adapted to interfit within notches 28 and 29 respectively provided in said bushing and said pin,—this key being in turn, retained by means such as a screw 30, shown as extending through a central bore 31 in the pin 16, and the head of this pin being preferably countersunk in a central depression 32, in such manner as to obviate wear thereon.

My present invention being directed more particularly to a preferred method of securing an accurately threaded or other pin, such as the pin 16, at a predetermined angle (as at a right angle) to a comparatively inaccessible surface, such as the surface 23 of a main member such as one of the legs 14, 15,—referring now more particularly to Figs. 3 and 4, I comment upon the very severe strains to which a pin 16 may be subjected, by reason of the enormous weight of a drill pipe extending thereabove; and upon the corresponding importance of providing means for the very secure retention of a pin, of suitable hard metal, within a leg, also formed of hard metal; and also upon the advantages in so securing pins, of the general character referred to, as to permit of their replacement in case of damage thereto.

In this connection, it will be appreciated that although the legs 14 and 15 are shown as slightly offset in a manner favorable to the cutting of a hole exceeding in diameter the extreme diameter of the respective discs 17, the distance between the inner faces 23, 23' is not favorable to the execution of welding operations in the space between said legs; and I accordingly so dispose the flaring surface 21 of the mentioned bore, provided in each leg, and an oppositely inclined or tapered surface 33 of the outwardly diminishing body 20 of each pin, as to provide an annular space 34, around each pin body, favorable to the reception of a considerable quantity of initially molten metal, for a bending effect; and at least one of the mentioned walls (either the outwardly flared wall of the bore 21 or the outwardly tapering surface 33 of the pin body 20) may be rendered concave in profile, as at 35, near the bottom thereof,—the angle between the mentioned walls and the concave configuration referred to being favorable to the insertion of a metallic electrode (or of another body of metal to be melted for a welding effect) at a considerable angle relatively to the surface upon which the molten metal is intended to be disposed.

For example, during the beginning of welding operations, assuming a pin to be inserted and held in the relative position illustrated in Figs. 2, 3 and 4 (as by a drive fit or by a suitably tight fit or a drive fit in the mentioned region 24,) the leg or other main member and/or pin 16 being so connected with a source of current (in the case of electric welding) as to constitute the same an electrode, and assuming a cooperating electrode 36 to be formed of the metal by which said main member and pin are to be united (all parts being advantageously made of, for example, a chrome-nickel steel) said last-mentioned electrode may advantageously be shifted between and beyond positions such as those illustrated in Figs. 3 and 4,—forming in all cases a considerable angle with the adjacent wall. By proceeding in this way, I prevent undue spreading of the arc, concentrating the heating effect at first in the bottom of the annular passage 34, and gradually filling the same, under advantageous conditions, with a body 37 of deposited metal very effectively bonded to both of the adjacent walls.

I find that a welded joint formed in the described manner is entirely permanent; but that it is nevertheless such as to permit a broken pin to be drilled out, as occasion may require (the mentioned bore 31 being then optionally employed for a centering effect during drilling operations) and the insertion of a new pin by steps of the general character described.

The general mode of use of these drill bits being well understood, I may emphasize, in conclusion, the fact that large bits embodying the invention set forth in my mentioned patent are currently made and sold at a cost of several hundred dollars a piece, whereas the insertion or replacement of a threaded pin in the general manner described, whether the welding is done by electrical means or by the use of an oxygen-acetylene flame, or by a so-called thermite process, or otherwise, need not cost more than (say) fifteen to thirty dollars; and, assuming suitable simple equipment to be at hand, such insertion or replacement may easily be effected, by workmen of ordinary skill, at any shop in the region where the drilling is in progress.

Although I have herein described a single complete embodiment of my invention, it should be understood not only that various features thereof might be independently employed, but also that numerous modifications might be made by those skilled in the art to which this case relates, without the slightest departure from the spirit and scope of my invention, as the same is indicated above and in the following claims.

I claim as my invention:

1. A method of securing inwardly projecting bearing pins to the relatively inaccessible inner surfaces of legs integral with shanks of drilling bits which comprises: providing said legs respectively with outwardly expanding openings extending therethrough, each opening being narrowest in a region in proximity to an inner surface of a leg; providing each pin with a body which tapers uniformly from an intermediate region which has a maximum diameter adapting it to interfit within the mentioned narrowest portion of an opening through a leg; and securing said pins in said legs by depositing molten metal in resultant annular spaces between said pins and said legs.

2. A method of securing inwardly projecting bearing pins to the relatively inaccessible inner surfaces of legs integral with shanks of drilling bits which comprises: providing said legs respectively with outwardly expanding openings extending therethrough, each opening being narrowest in a region in proximity to an inner surface of a leg; providing each pin with a body which tapers uniformly from an intermediate region which has a maximum diameter adapting it to interfit within the mentioned narrowest portion of an opening through a leg; and securing said pins on said legs by depositing molten metal in resultant annular spaces between said pins and said legs,—the inclinations of oppositely inclined walls of said pins and said legs being such as to permit an electrode inserted therebetween to contact with one of said walls at a considerable angle.

3. In the attachment of a pin to a main member having a relatively inaccessible inner surface and a more accessible outer surface, a method which comprises: providing said pin with a uniformly tapered body substantially corresponding in length with the thickness of said main member; providing said main member with a bore inwardly diminishing to a diameter corresponding to the maximum diameter of said tapered body; inserting said body within said bore; and forming a joint between said body and said member by the deposition of molten metal within a resultant annular space.

4. A method of the general character defined in claim 3 in which said pin is threaded in advance of its insertion in said main member.

5. A method of the general character defined in claim 3 in which said pin is longitudinally bored in advance of its insertion in said main member.

6. A method of the general character defined in claim 3 in which said pin is provided with a region of maximum diameter which adapts it to interfit within the narrowest portion of the bore in said main member,—one of the adjacent walls being so concaved as to permit the insertion of an electrode at a comparatively high angle relatively thereto.

In testimony whereof, I have hereunto set my hand at Los Angeles, California, this 16th day of June, 1926.

HALL H. HOLDAWAY.